United States Patent
Kobari et al.

[11] Patent Number: 5,397,544
[45] Date of Patent: Mar. 14, 1995

[54] AIR BAG INFLATION GAS GENERATOR

[75] Inventors: Hirokazu Kobari; Junichi Kishimoto, both of Fukushima; Kazuhiro Seki; Kanichi Fukuda, both of Saitama, all of Japan

[73] Assignees: Nippon Koki Co., Ltd; Honda Giken Kogyo Kabushiki Kaisha, both of Tokyo, Japan

[21] Appl. No.: 210,643

[22] Filed: Mar. 18, 1994

Related U.S. Application Data

[63] Continuation of Ser. No. 954,969, Sep. 30, 1992, abandoned.

[30] Foreign Application Priority Data

Nov. 14, 1991 [JP] Japan ................. 3-299116
Nov. 14, 1991 [JP] Japan ................. 3-299118

[51] Int. Cl.[6] .......................................... B01J 19/08
[52] U.S. Cl. ...................... 422/167; 422/166; 422/305; 280/736
[58] Field of Search ............ 422/165, 166, 167, 305; 102/530, 531; 280/736, 741

[56] References Cited

U.S. PATENT DOCUMENTS

| | | | |
|---|---|---|---|
| 3,715,131 | 2/1973 | Hurley et al. | 280/736 |
| 3,904,221 | 9/1975 | Shiki et al. | 280/736 |
| 4,005,876 | 2/1977 | Jorgensen et al. | 280/741 |
| 4,012,211 | 3/1977 | Goetz | 55/485 |
| 4,109,578 | 8/1978 | Goetz | 280/741 |
| 4,158,696 | 6/1979 | Wilhelm | 422/166 |
| 4,200,615 | 4/1980 | Hamilton et al. | 422/166 |
| 4,296,084 | 10/1981 | Adams et al. | 423/351 |
| 4,322,385 | 3/1982 | Goetz | 422/165 |
| 4,380,346 | 4/1983 | Davis et al. | 280/736 |
| 4,817,828 | 4/1989 | Goetz | 280/736 |
| 4,846,368 | 7/1989 | Goetz | 222/3 |
| 4,938,501 | 7/1990 | Wipasuramonton | 280/736 |
| 4,950,458 | 3/1990 | Cunningham | 280/736 |
| 4,998,751 | 3/1991 | Paxton et al. | 280/741 |
| 5,005,486 | 4/1991 | Lenzen | 102/531 |

FOREIGN PATENT DOCUMENTS

| | | | |
|---|---|---|---|
| 3733436 | 4/1988 | European Pat. Off. | 280/736 |
| 2155860 | 6/1990 | Japan | 280/736 |

*Primary Examiner*—Timothy M. McMahon
*Attorney, Agent, or Firm*—Kalish & Gilster

[57] ABSTRACT

An air bag inflation gas generator to feed combustion gas for inflation of air bags such as air gas for absorbing collision shocks, life jackets, rafts and escape chutes, that aim to easily and surely control the flow rate of combustion gas into the air bag at the initial inflation of the air bag and to effectively utilize the entire purifying filter. The generator has a longitudinal outer cylindrical member having a plurality of gas outlets in its outer periphery, an inner cylindrical member inserted in the outer cylindrical member having gas flow openings formed in the outer periphery, a final filter disposed between the outer cylindrical member and the inner cylindrical member, a plurality of gas generating agents accommodated in a laminated state in the axial direction of the inner cylindrical member having a through hole formed at the center, and an igniter and an ignition agent disposed at one end of the inner cylindrical member and a shielding member for shielding the through hole is disposed at the gas generating agent or between the gas generating agents disposed at the middle part of the inner cylindrical member. This invention forms a plurality of gas flow openings in the substantial part of the outer periphery of the inner cylindrical member, and the hole area of these gas flow openings are designed to be larger as they get a way from the gas outlets of the outer cylindrical member.

3 Claims, 11 Drawing Sheets

AIR BAG INFLATION GAS GENERATOR

This application is a continuation of application Ser. No. 07/954,969, filed Sep. 30, 1992, now abandoned.

BACKGROUND OF THE INVENTION

1. Field of the Invention

This invention relates to an air bag inflation gas generator to feed combustion gas for inflation of air bags such as air bags for absorbing collision shocks, life jackets, rafts, and escape chutes.

2. Description of the Prior Art

A prior shock absorber to protect a passenger car driver from shocks at collision accidents comprises an air bag, for example, having a capacity of 60 liters and a gas generator to inflate the air bag with gas. At a collision accident of a passenger car, explosives or other gas generating agents having a similar composition thereto, which are charged in the gas generator, are ignited and burnt to produce some gas. The air bag is instantaneously inflated by the resultant gas for driver protection against any collision shocks, which can avoid possible serious injury.

FIG. 11 shows a prior air bag inflation gas generator disclosed in the Japanese Patent Application Laid-open No. 155857/1990. In the drawing, the reference numeral 1 shows a combustion chamber containing a plurality of gas generating agents 2 in the laminated state.

The gas generating agents 2 are a circular plate having a through hole 3 at the center, and the through hole 3 accommodates an ignition agent 4.

These gas generating agents 2 are accommodated in a concealed container 5. At the center of this concealed container 5, a concave part 6 is formed to be depressed toward the through hole 3 of the gas generating agents 2.

In the concave part 6 is provided an igniter 7 to burn the gas generating agents 2.

The combustion chamber 1 has a combustion chamber filter 8 along its inner wall. And, a plenum chamber 10 annually surrounds the combustion chamber 1 and receives gas flow through an orifice 9 from the combustion chamber filter 8.

The plenum chamber 10 contains a plenum chamber filter consisting of an upper filter 11 and a gas filter 12.

The plenum chamber 10 contains a gas outlet 13 to supply the gas flow from the gas filter 12 to an air bag.

In this type of air bag inflation gas generator, the powder in the igniter 7 burns when the igniter 7 is energized. The ignition agent 7 in turn causes the ignition agent 4 to burn and the gas generating agents 2 are burned. Gas from the gas generating agents 2 flows into the plenum chamber 10 through a combustion chamber filter 5 arranged along the inner wall of the combustion chamber 1. The gas is purified by the upper filter 11 and the gas filter 12 and flows into the air bag through the gas outlet 13. The air bag can be completely inflated within a very short time, for example, approximately 0.04 second.

That prior air bag inflation gas generator, however, has drawbacks that the combustion gas capacity of the gas generating agents 2 is limited and the purifying performance of the combustion gas is also limited.

Specifically, when the air bag for a front passenger seat is inflated, because the front passenger seat has a different riding environment from the driver seat and a passenger takes various positions, and when a child takes the front passenger seat, physical features are different from an adult, requiring, for example, an air bag to have a large capacity of 2.5 times of a conventional air bag for the driver seat. Therefore, it has been demanded that the combustion gas capacity of the gas generating agents is large and the gas generator for air bag inflation which can purify the large volume of combustion gas surely.

The present inventor has developed a gas generator for inflating an air bag which has remedied the conventional problems and filed patent applications (refer to Japanese Patent Application Laid-open No. 146842/1992, Japanese Patent Application Laid-open No. 146843/1992).

This air bag inflation gas generator, as shown in FIG. 12, has combustion chambers 21, 22 in which gas generating agents 20 are accommodated formed by a partition member 23 at both ends of a longitudinal outer cylindrical member 19 having gas outlets 18 formed at the middle section 17. And a cylindrical final filter 24 is disposed inside the middle section 17 of the outer cylindrical member 19. An intermediate filter 25 is disposed between the final filter 24 inside the outer cylindrical member 19 and the partition member 23. And, an orifice 26 is opened at a position on the side of the intermediate filter 25 of the partition member 23.

And, the combustion chamber 21 on one side and the combustion chamber 22 on the other side are connected with a fuse device 27 to ignite gas generating agents 20 in the combustion chamber 22 after the lapse of a certain time after starting combustion of gas generating agents 20 in the combustion chamber 21.

With this air bag inflation gas generator, the combustion gas capacity of the gas generating agents 20 can be largely increased than before, and a large volume of combustion gas can be surely purified.

With the fuse device 27, combustion of the gas generating agents 20 in the combustion chamber 22 is delayed, for example about 5–20 msec from the combustion of the gas generating agents 20 in the combustion chamber 21, so that at the initial inflation of the air bag, rapid flow of combustion gas into the air bag can be effectively prevented. Thus, impact against a passenger can be effectively eased.

However, such an air bag inflation gas generator uses the fuse device 27, so that there is disadvantages that the system becomes complicated and production costs increase.

FIG. 13 shows a conventional air bag inflation gas generator shown in Japanese Patent Application Laid-open No. 297336/1989. In the drawing, the reference numeral 28 indicates a longitudinal outer cylindrical member. This outer cylindrical member 28 has a plurality of gas outlets 29 formed in one side of the outer periphery.

At the center of the outer cylindrical member 28, pellet gas generating agents 30 are accommodated and, a cylindrical purifying filter 31 is disposed between the gas generating agents 30 and the outer cylindrical member 28.

On the gas outlets 29 side on the inside of the purifying filter 31, substantially semicircle barrier member 32 is disposed.

With the above air bag inflation gas generator, when the gas generating agents 30 burn, combustion gas from the gas generating agents 30 flows, by the action of the barrier member 32, opposite from the gas outlets 29 formed in the outer cylindrical member 28 and collides against the outer cylindrical member 28, turns its direction to pass through the purifying filter 31 for purification, then flows into the air bag through the gas outlets 29, and completely inflates the air bag in a short time.

However, with such a conventional air bag inflation gas generator, when the gas generating agents 30 burn, by the action of the barrier member 32, all combustion gas flows in the opposite direction from the gas outlets 29 formed in the outer cylindrical member 28, collides against the external cylindrical member 28 and turns its direction and is purified mainly at the opposite position of the barrier member 32 in the purifying filter 31, so that there is an disadvantage that the purifying filter is not entirely and effectively used.

SUMMARY OF THE INVENTION:

An object of this invention is to provide an air bag inflation gas generator which can simply and surely adjust the amount of combustion gas flowing into an air bag at the initial inflation of the air bag.

Another object of this invention is to provide an air bag inflation gas generator which is capable of using a purifying filter entirely and effectively.

A first air bag inflation gas generator of this invention comprises a longitudinal outer cylindrical member having a plurality of gas outlets in its outer periphery, an inner cylindrical member inserted in the outer cylindrical member and having gas flow openings formed in the outer periphery, a final filter disposed between the outer cylindrical member and the inner cylindrical member, a plurality of gas generating agents accommodated in a laminated state in the axial direction of the inner cylindrical member and having a through hole at the center, and an igniter and an ignition agent disposed on one end of the inner cylindrical member, and providing a shielding member to shield the through hole of the gas generating agents in the gas generating agents or between the neighboring gas generating agents disposed at the intermediate position in the inner cylindrical member.

With the first air bag inflation gas generator of this invention constructed as above, when electricity is passed to the igniter disposed at one end of the inner cylindrical member, the ignition agent burns, and the gas generating agents at the upstream of the shielding member starts to burn. This burning of the gas generating agents breaks the shielding member, and after the lapse of a certain time from the combustion of the gas generating agents at the upstream, the gas generating agents at the downstream of the shielding member burn.

Therefore, with the first air bag inflation gas generator of this invention, there is an advantage that the flowing amount of the combustion gas to the air bag at the initial inflation of the air bag can be easily and surely adjusted.

A second air bag inflation gas generator of this invention comprises a longitudinal outer cylindrical member having a plurality of gas outlets on one side of the outer periphery, the inner cylindrical member inserted in the outer cylindrical member and having gas flow openings formed, a purifying filter disposed between the outer cylindrical member and the inner cylindrical member, and gas generating agents accommodated in the inner cylindrical member, and the gas flow openings being formed in plural through the outer periphery of the inner cylindrical member and the opening area of the gas flow openings being increased in size as they get away from the gas outlets.

In the second air bag inflation gas generator of this invention structured above, the gas flow openings near the gas outlets and where the gas flow velocity of combustion gas is comparatively fast have the opening area made small, and the gas flow openings far away from the gas outlets and where the gas flow velocity of combustion gas is comparatively slow have the opening area made large, so that the flow rate of the combustion gas flowing from each gas flow opening to the purifying filter side is substantially same at each gas flow opening.

Therefore, in the second air bag inflation gas generator of this invention, the gas flow openings are disposed in substantially the entire periphery of the inner cylindrical member in plural, and the opening area of the gas flow openings is made to be large as they get away from the gas outlets, so that there is an advantage that the purifying filter can be entirely and effectively used.

DESCRIPTION OF THE PREFERRED EMBODIMENT OF THE INVENTION

Now, details of this invention will be described with reference to the attached drawings.

Figure 1:
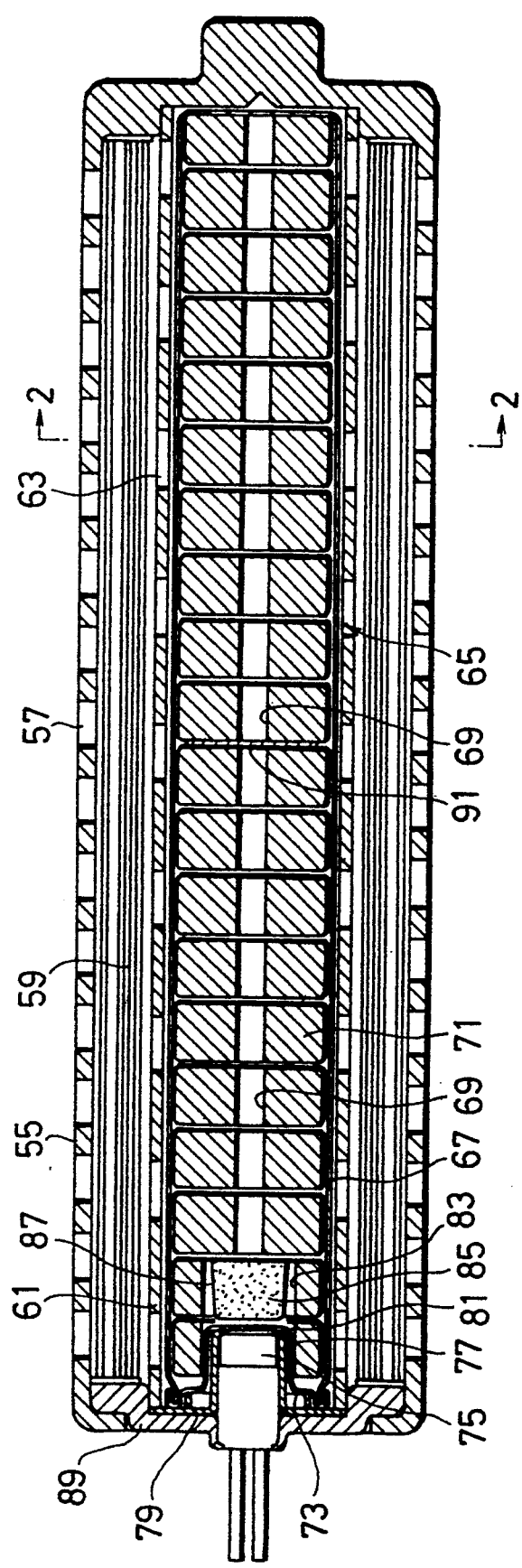
FIG. 1 is a vertical section showing one embodiment of a first air bag inflation gas generator of this invention.
Figure 2:
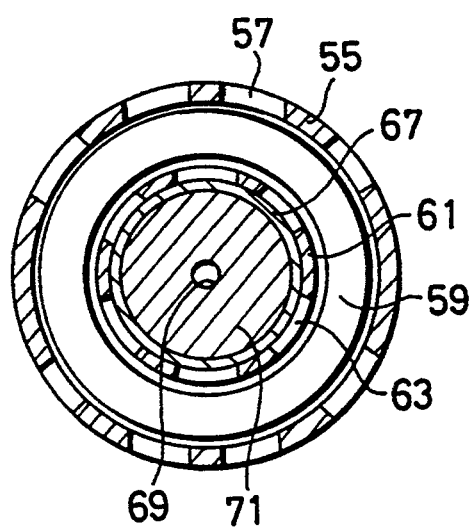
FIG. 2 is a transverse cross section taken on line 2—2 of FIG. 1.
Figure 3:
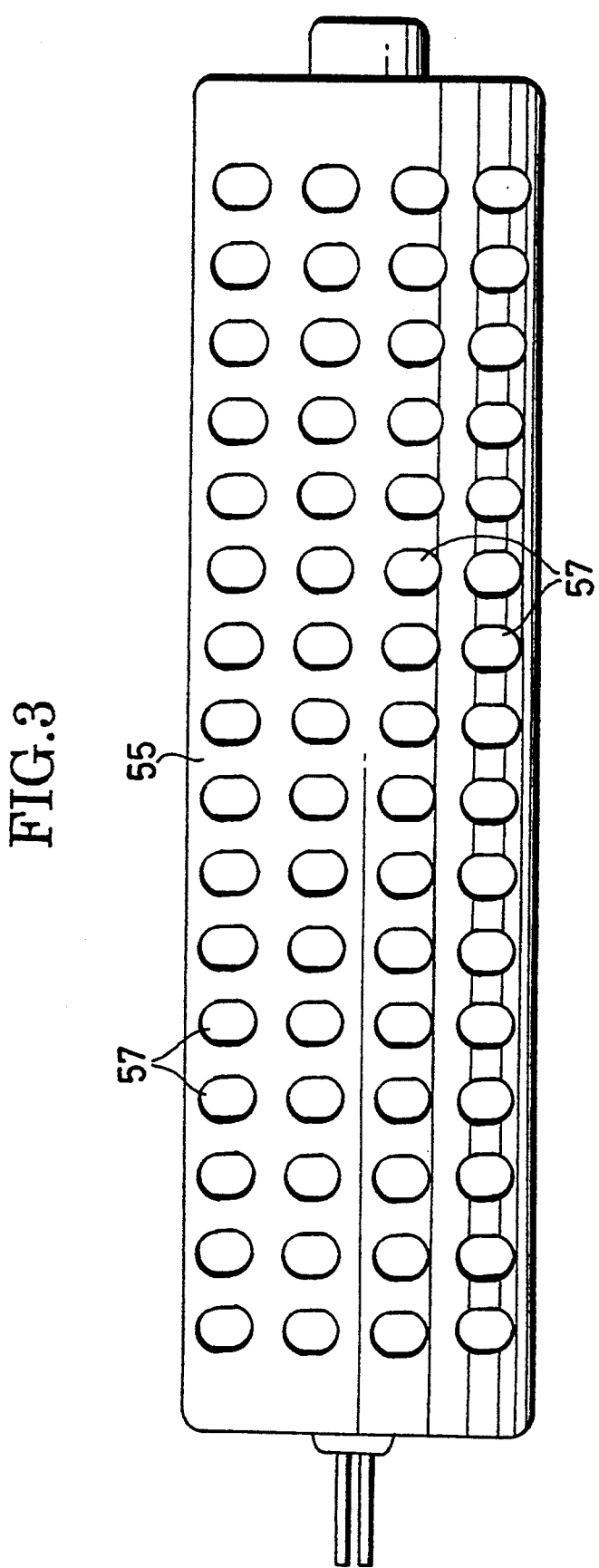
FIG. 3 is a top view of FIG. 1.

FIG. 1 to FIG. 3 show one embodiment of a first air bag inflation gas generator of this invention, and in the drawings the reference numeral 55 indicates a bottom-closed longitudinal outer cylindrical member.

The outer periphery of this outer cylindrical member 55 has lots of gas outlets 57 formed entirely.

Inside the outer cylindrical member 55 is disposed a cylindrical final filter 59.

This final filter 59 is structured by winding gauze wire or woven metal wire one over another and has the function that the combustion gas is cooled so that the air bag is not damaged, the combustion residue contained in the combustion gas is removed, and harmless nitrogen gas only is supplied into the air bag.

Inside the final filter 59 is inserted an inner cylindrical member 61.

The outer periphery of the inner cylindrical member 61 is formed with lots of gas flow openings 63 entirely.

The inner cylindrical member 61 accommodates a gas generating agent pack 65.

Specifically, in FIG. 1, the reference numeral 67 indicates a bottom-closed longitudinal cylindrical pack made of aluminum, for example.

In this cylindrical pack 67 is accommodated a plurality of gas generating agents having a through hole 69 formed at the center and in the laminated state in the axial direction.

One side of the cylindrical pack 67 is tightly closed by a cap 73 made of aluminum, for example.

The cap 73 is formed by tightly winding around the outer periphery of the cylindrical pack 67.

At the center of the cap 73 is formed a projection 77 to accommodate an igniter 75.

This projection 77 is inserted through an igniter holder 79 into a through hole 81 of a gas generating agent 71 disposed at one end of the bottom-closed cylindrical pack 67.

Within a through hole 83 of a gas generating agent 71 disposed on one side of the cylindrical pack 67 is disposed an ignition agent 85 adjacent to the end face of the projection 77 of the cap 73.

This ignition agent 85 is accommodated within an ignition agent pack 87.

And, at the opening end of the outer cylindrical member 55 is disposed a lid 89, which is fixed to the outer cylindrical member 55 by caulking.

The lid 89 has the igniter 75 fixed by caulking.

Figure 4:
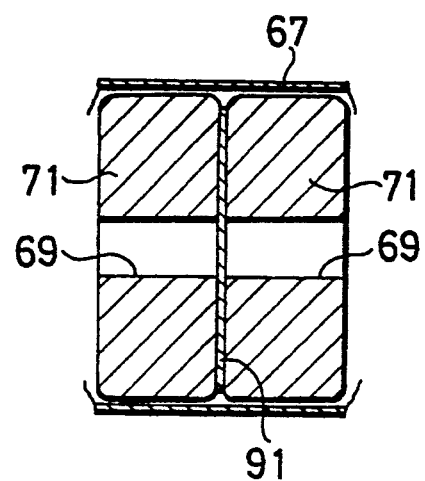
FIG. 4 is a sectional view largely showing a part of the shielding member of the air bag inflation gas generator of FIG. 1.

In this embodiment, as shown in FIG. 1 and FIG. 4, a shielding member 91 is disposed to shield the through hole 69 of the gas generating agent 71 between the gas generating agents 71 disposed at the middle of the cylindrical pack 67.

This shielding member 91 is formed of a thin plate such as aluminum and breaks when a certain pressure applies thereto and works as a pressure releasing valve.

In the aforementioned air bag inflation gas generator, when electricity is passed to the igniter 75, the ignition agent 85 burns in turn burning the gas generating agents 71. And, the cylindrical pack 67 of the gas generating agent pack 65 breaks at the position of a gas flow openings 63 of the inner cylindrical member 61. Combustion gas passes through the gas flow openings 63 of the inner cylindrical member 61 to flow into the final filter 59 to be purified and flows into the air bag from the gas outlets 57 of the outer cylindrical member 55.

And, in this embodiment, when electricity is passed to the igniter 75 disposed at one end of the inner cylindrical member 61, the ignition agent 85 burns and at the upstream of the shielding member 91, i.e. the gas generating agents 71 on the side of the igniter 75 burn first. This burning of the gas generating agents 71 breaks the shielding member 91 and in a certain time after the burning of the gas generating agents 71 at the upstream, the gas generating agents 71 at the down stream of the shielding member 91 burn.

In the air bag inflation gas generator structured as above, the generator may comprise the longitudinal outer cylindrical member 55 having a plurality of gas outlets 57 formed on the outer periphery, the inner cylindrical member 61 inserted in the outer cylindrical member 55 and having the gas flow openings 63 formed on the outer periphery, the final filter 59 disposed between the outer cylindrical member 55 and the inner cylindrical member 61, a plurality of gas generating agents 71 accommodated in the stacked state in the axial direction of the inner cylindrical member 61 and having the through hole 69 at the center, and the igniter 75 and the ignition agent 85 disposed at one end of the inner cylindrical member 61. And the shielding member 91 to shield the through hole 69 of the gas generating agents 71 is disposed between the gas generating agents 71 disposed at the middle of the inner cylindrical member 61, so that the flow rate of the combustion gas to the air bag at the initial inflation of the air bag can be easily and surely controlled.

Specifically, in the aforementioned air bag inflation gas generator, when electricity is passed to the igniter 75 disposed at one end of the inner cylindrical member 61, the ignition agent 85 burns, and first the gas generating agents 71 at the upstream of the shielding member 91 starts burning, and the shielding member 91 is broken by the burning of the gas generating agents 71, and in a certain time after the burning of the gas generating agents 71 at the upstream, the gas generating agents at the downstream of the shielding member 91 burn, so that rapid flow of the combustion gas into the air bag at the initial inflation of the air bag can be effectively prevented, and impact to a passenger can be effectively relieved.

In the aforementioned air bag inflation gas generator, the shielding member 91 is disposed between the gas generating agents 71 to provide a time lag, so that the structure is very simple, and high reliability can be attained.

By varying the thickness of the shielding member 91, the flow rate of the combustion gas into the air bag at the initial inflation of the air bag can be easily controlled to an optimum value.

Figure 5:
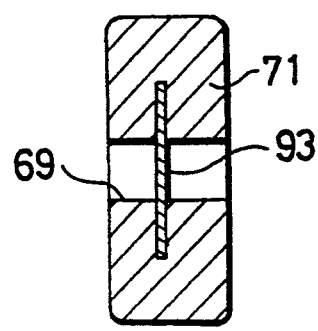
FIG. 5 is a sectional view showing the arrangement of the shielding member of another embodiment of the first air bag inflation gas generator of this invention.

FIG. 5 shows another embodiment of the first air bag inflation gas generator of this invention. In this embodiment, the outer periphery of the shielding member 93 is embedded at the center of the gas generating agent 71 disposed at the center of the cylindrical pack 67.

In this air bag inflation gas generator, substantially the same effects as in the embodiment shown in FIG. 1 can be obtained.

Figure 6:
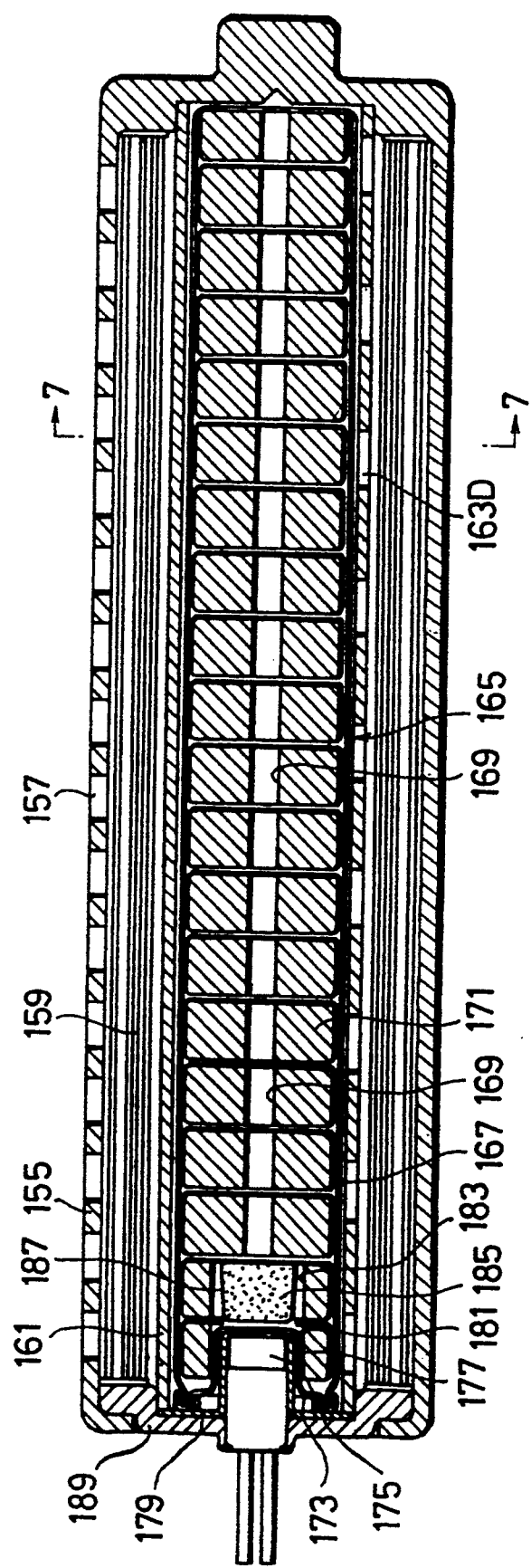
FIG. 6 is a vertical section showing one embodiment of the second air bag inflation gas generator of this invention.
Figure 7:
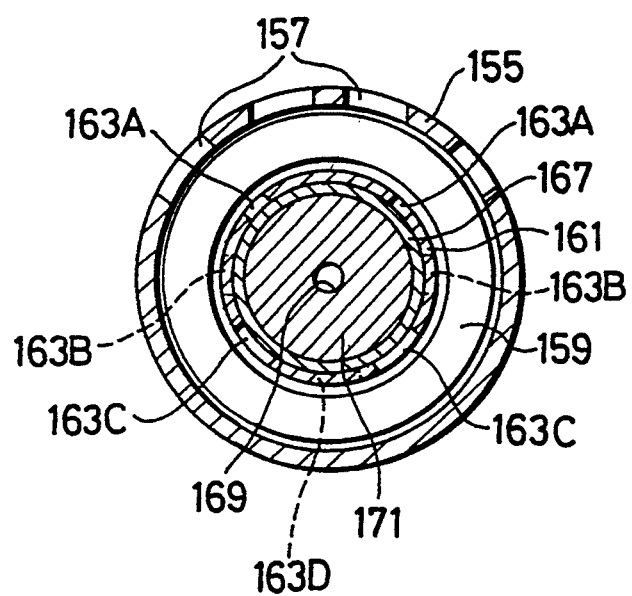
FIG. 7 is a transverse cross section taken on line 7—7 of FIG. 6.

FIG. 6 and FIG. 7 show an embodiment of the second air bag inflation gas generator of this invention. In the drawings, the reference numeral 155 indicates a bottom-closed longitudinal outer cylindrical member.

On the outer periphery of the outer cylindrical member 155, many gas outlets 157 are formed in one side.

Inside the outer cylindrical member 155 is arranged a cylindrical purifying filter 159.

This purifying filter 159 is structured by winding gauze wire or woven metal wire one over another and has the function that the combustion gas is cooled so that the air bag is not damaged, the combustion residue contained in the combustion gas is removed, and harmless nitrogen gas only is supplied into the air bag.

Inside the purifying filter 159 is inserted an inner cylindrical member 161 forming a combustion chamber.

In the outer periphery of the inner cylindrical member 161, many gas flow openings 163A, 163B, 163C and 163D are formed.

Within the inner cylindrical member 161 is accommodated a gas generating agent pack 165.

That is to say, in the drawing, the reference numeral 167 indicates a bottom-closed longitudinal cylindrical pack made of aluminum for example.

This cylindrical pack 167 accommodates a plurality of gas generating agents 171 having a through hole 169 at the center as laminated in the axial direction.

One end of the cylindrical pack 167 is tightly closed by a cap 173 made of aluminum, for example.

And the cap 173 is formed by tightly winding around the outer periphery of the cylindrical pack 167.

At the center of the cap 173 is formed a projection 177 to accommodate an igniter 175.

This projection 177 is inserted through an igniter holder 79 into a through hole 181 of a gas generating agent disposed at one end of the bottom-closed cylindrical pack 167.

Within a through hole 183 of the gas generating agent disposed on one end of the cylindrical pack 167 is disposed an ignition agent 185 adjacent to the end face of the projection 177 of the cap 173.

This ignition agent 185 is accommodated within an ignition agent pack 187.

And, at the opening end of the outer cylindrical member is disposed a lid 189, which is fixed to the outer cylindrical member 155 by caulking.

The lid 189 has the igniter 175 fixed by caulking.

Figure 8:
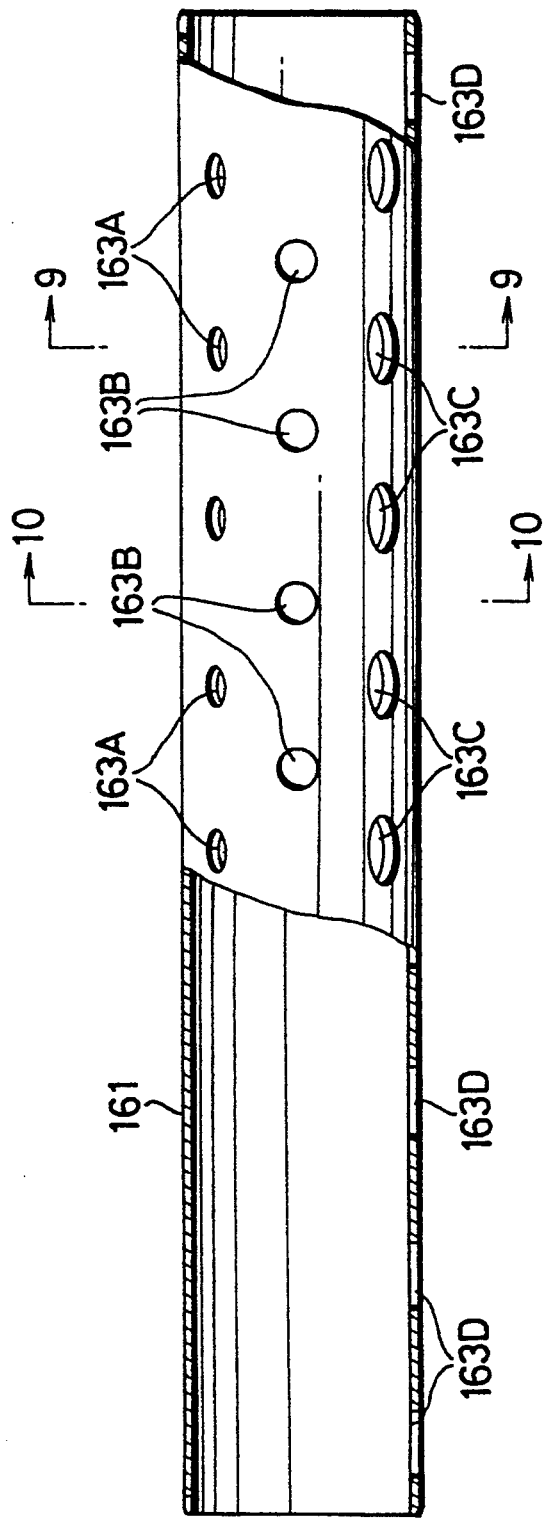
FIG. 8 is a side elevation showing a partial section of the inner cylindrical member of FIG. 6.
Figure 9:
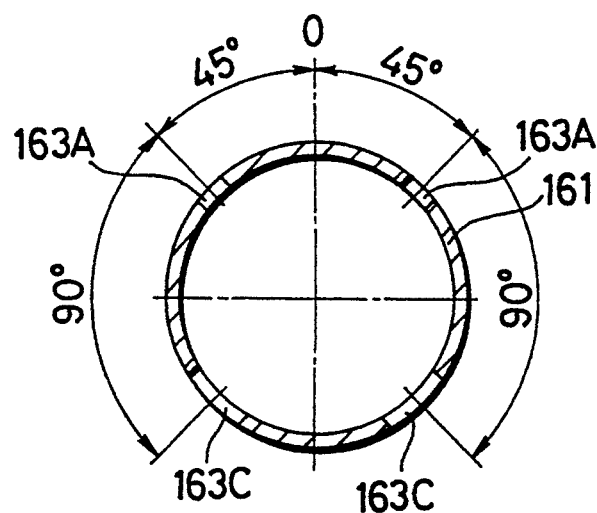
FIG. 9 is a transverse cross section taken on 9—9 of FIG. 8.
Figure 10:
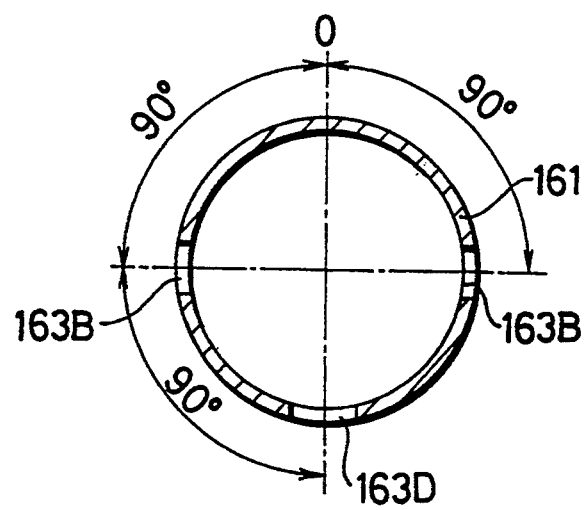
FIG. 10 is a transverse cross section taken on 10—10 of FIG. 8.
Figure 11:
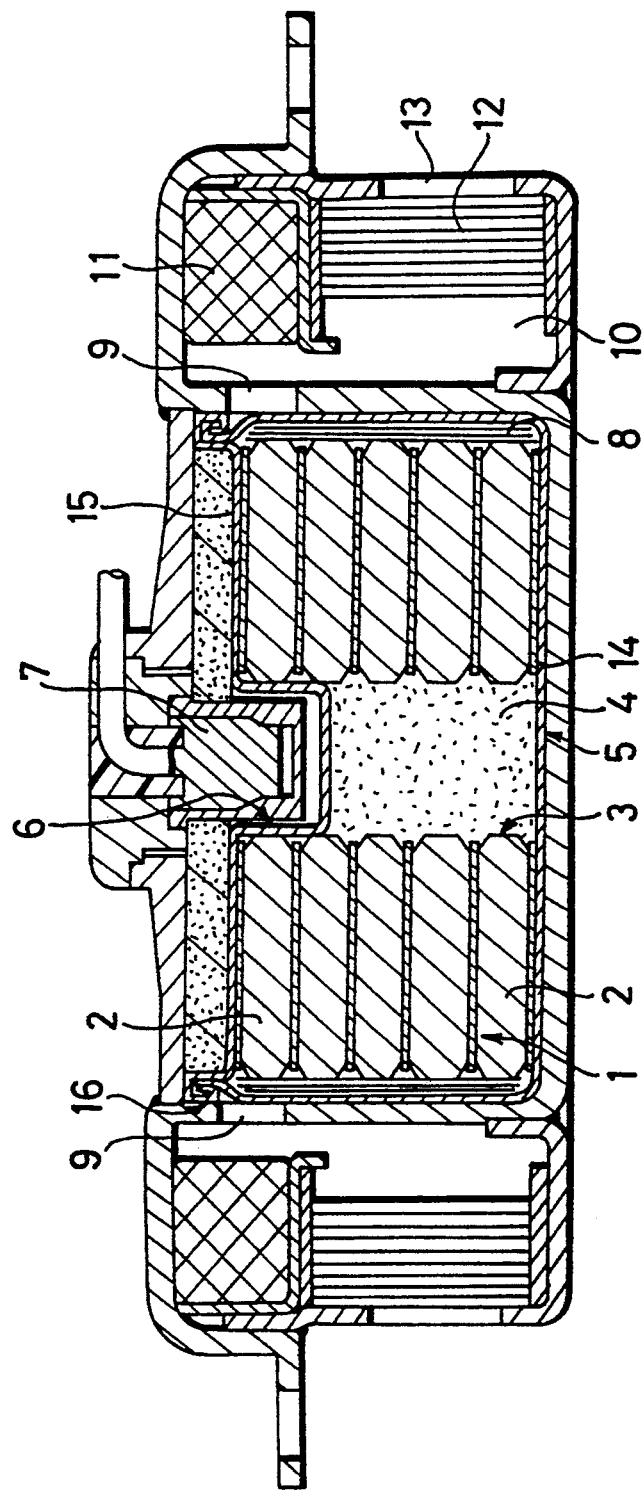
FIG. 11 is a vertical section of a conventional air bag inflation gas generator.
Figure 12:
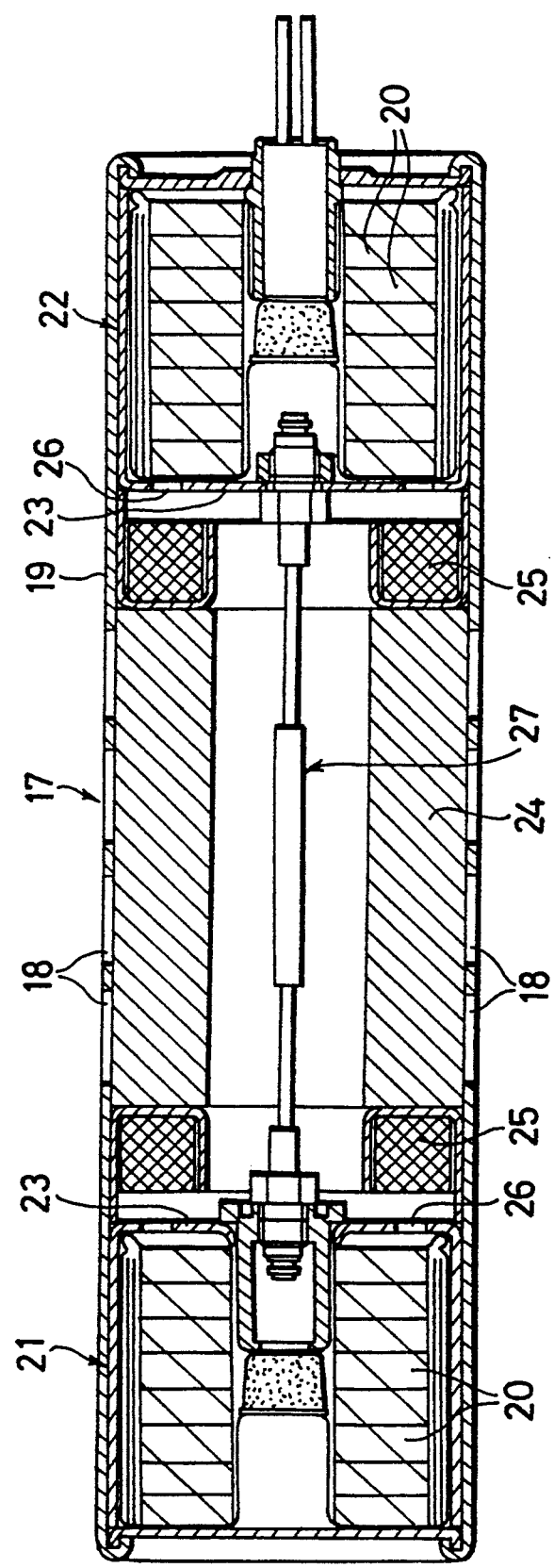
FIG. 12 is a vertical section of the air bag inflation gas generator previously filed by the applicant.

In this embodiment, the inner cylindrical member 161 has gas flow openings 163A, 163B, 163C and 163D formed in many numbers in substantially entire area of the outer periphery of the inner cylindrical member 161 as shown in FIG. 8 through FIG. 10.

And the hole area of these gas flow openings 163A, 163B, 163C and 163D is designed to be large as they get away from the gas outlets 157 formed on one side of the outer cylindrical member 155.

Specifically, when the center position 0 of the gas outlets 157 formed in the outer cylindrical member 155 is 0° the hole diameter of the circular gas flow opening 163A formed at an angle of 45° from the center position 0 is 4 mm, the hole diameter of the circular gas flow opening 163B formed at an angle of 90° from the center position 0 is 6 mm, the hole diameter of the circular gas flow opening 163C formed at an angle of 135° from the center position 0 is 8 mm, and the hole diameter of the circular gas flow opening D formed at an angle of 180° from the center position 0 is 10 mm.

In the aforementioned air bag inflation gas generator, when electricity is passed to the igniter 175, the ignition agent 185 burns in turn burning the gas generating agents 171. And, the cylindrical pack 167 of the gas generating agent pack 165 breaks at the positions of gas flow openings 163A, 163B, 163C and 163D of the inner cylindrical member 161. Combustion gas passes through the gas flow openings 163A, 163B, 163C and 163D of the inner cylindrical member 161 to flows into the purifying filter 159 to be purified and flows into the air bag from the gas outlets 157 of the outer cylindrical member 155.

In the air bag inflation gas generator structured as described above, the gas flow openings 163A, 163B, 163C and 163D are formed in plurality on substantially the entire outer periphery of the inner cylindrical member 161, and the hole area of these gas flow openings 163A, 163B, 163C and 163D is designed to be larger as they get away from the gas outlets 157, so that the purifying filter 159 can be entirely used effectively and the purifying efficiency of combustion gas by the purifying filter 159 can be improved.

In the air bag inflation gas generator described above, the hole area of the gas flow openings near the gas outlets 157 and with relatively rapid flowing speed of combustion gas is made small and the hole area of the gas flow openings away from the gas outlets 157 and with relatively slow flowing speed of combustion gas is made large, so that the flow rate of combustion gas flowing from each gas flow opening 163A, 163B, 163C and 163D to the purifying filter 159 becomes substantially the same in each gas flow opening 163A, 163B, 163C and 163D, and as a result, substantially the same amount of combustion gas flows in each part of the purifying filter 159. And the purifying filter 159 can be entirely used effectively.

Figure 13:
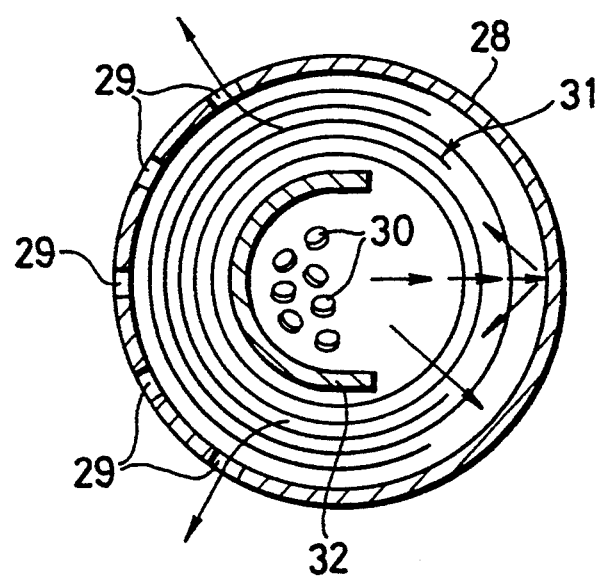
FIG. 13 is a transverse cross section showing a conventional air bag inflation gas generator.

In the aforementioned air bag inflation gas generator, like the one shown in FIG. 13, combustion gas does not concentrate on the purifying filter positioned opposite to the gas outlets, so that even if the pressure in the inner cylindrical member 161 is comparatively small, it is possible to surely flow combustion gas from the gas outlets 157.

In the above embodiment, the gas flow openings 163A, 163B, 163C and 163D and the gas outlets 157 are described to be formed in the shape of circle. But, this invention is not limited to such an embodiment and they may be of course made in the shape of an oval or ellipse, for example.

What is claimed is:

1. An air bag inflation gas generator comprising a longitudinal outer cylindrical member having a plurality of gas outlets formed in its periphery, an inner cylindrical member inserted in the outer cylindrical member and having a plurality of gas flow openings formed in the outer periphery, a final filter disposed between the outer cylindrical member and the inner cylindrical member, a cylindrical pack within the inner cylindrical member containing a plurality of gas generating agents laminated in an axial direction, said gas generating agents having essentially one through hole at center, and an igniter and an ignition agent accommodated within an ignition agent pack, adjacent to the igniter and disposed at one end of the inner cylindrical member, and a shielding member to shield the through hole of the gas generating agents positioned in the gas generating agents or positioned between neighboring gas generating agents disposed at an intermediate position in the inner cylindrical member, wherein, when electricity is passed to the igniter, the ignition agent burns, rupturing the ignition agent pack, in turn igniting the gas generating agents on the side of the igniter, which release combustion gas and break the shielding member, and after a time, the gas generating agents down stream of the shielding member burn, releasing combustion gas whereafter the cylindrical pack breaks at the position of the gas flow openings of the inner cylindrical member and the combustion gas passes through the gas flow openings of the inner cylindrical member to flow into the final filter to be purified and flow into the air bag from the gas outlets of the outer cylindrical member.

2. An air bag inflation gas generator according to claim 1, wherein the shielding member is formed of an aluminum plate and breaks when a certain pressure is applied thereto and works as a pressure releasing valve.

3. The gas generator of claim 1, wherein opening areas of the gas flow openings are increased in size as they get away from the gas outlets.

* * * * *